Figure 1:
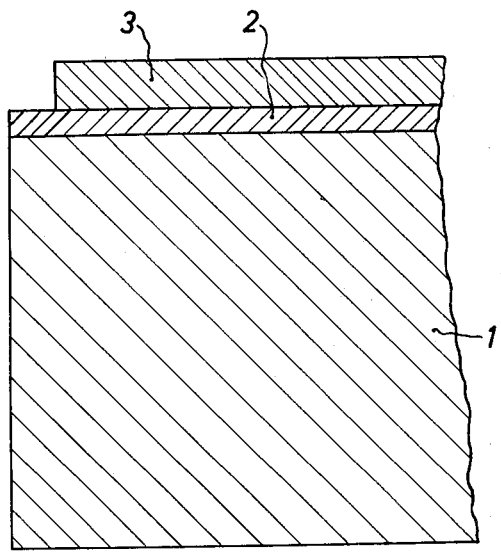

INVENTORS
Rudolf Waldkötter
and Alfred M. Hase.
BY
ATTORNEY

United States Patent Office 2,750,540
Patented June 12, 1956

2,750,540

SELENIUM RECTIFIERS AND THEIR MANUFACTURE

Erich Gerhard Rudolf Waldkötter and Alfred Max Hase, Pretzfeld, Germany, assignors to Siemens-Schuckertwerke Aktiengesellschaft, Berlin-Siemensstadt and Erlangen, Germany, a German corporation Application August 17, 1950, Serial No. 179,968

7 Claims. (Cl. 317—234)

The invention relates to barrier-layer rectifiers, especially selenium rectifiers, and to a new method of manufacturing them.

The known selenium rectifiers comprise as main parts a base electrode, a selenium-layer applied to the base electrode, and a counter electrode joined with the selenium layer. The counter electrode consists of metal or a metal alloy, for instance a tin-cadmium alloy, which causes the barrier effect in the contacting zones of the adjacent selenium layer. In the known rectifier the base electrode serves not only to secure a good electrical contact with the selenium but also to give the recifier the mechanical strength necessary for its manufacture and use. Accordingly, rather strong metallic plates, especially iron and aluminum plates, with a thickness between about 0.5 mm. to 1 mm. have heretofore been used as base electrodes in selenium rectifiers. The selenium layer and the counter electrode (which may be sprayed onto the selenium layer) are usually very thin, their thickness being generally only about 0.2 mm., so that the total thickness of the rectifier, including the base electrode, is about 0.7 mm. to 1.2 mm. If rectifiers of this kind are subjected to bending, the result, according to our experience, is destructive or causes a large diminution of the rectifier effect.

It is an object of our invention to provide barrier-layer rectifiers, particularly selenium rectifiers, which combine a smaller thickness than heretofore customary with a greatly reduced tendency of becoming damaged due to any bending stresses that may be imposed upon such rectifiers due to their manufacture or use.

To achieve this object, as well as other objects and advantages apparent from, or referred to in, the following, we make the base electrode of the rectifier unit flexibly thin so that it is essentially a metal foil, giving it a thickness of only 0.001 mm. to about 0.01 mm. Since the selenium layer and the counter electrode of such a rectifier are also very thin, such a rectifier is flexible as a whole.

We have made the surprising discovery that such flexible rectifier units not only have good rectifying qualities but also retain these qualities if subjected to considerable bending. We explain this by the face that, due to the small thickness of the base electrode, this electrode does not during bending impose sufficient stress upon the selenium layer to cause cracking of that layer.

Rectifiers according to the invention may readily be given about one fifth of the thickness of the known selenium rectifiers. This reduction in size is in itself a considerable advantage because now about five rectifier units can be accommodated in the space required by only one unit of the known design. This permits various improvements of assemblies and apparatus to be equipped with such rectifiers. For instance, the dimensions of the apparatus may be reduced, or the operation of the apparatus may be improved by providing it with a larger number of rectifier units than could previously be accommodated. The flexibility of the rectifier may also be used to advantage. For instance, a selenium rectifier can now be wound upon a tube traversed by a cooling medium for dissipating the heat losses, thus permitting a higher current loading of the rectifier. It is also possible to give the selenium rectifier the shape of a roll to be placed into narrow spaces. Such a rolled or curved rectifier unit may be stiffened by adding a coating of metal or other material, for instance, sprayed or vaporized onto the rolled or curved rectifier.

Figure 4:
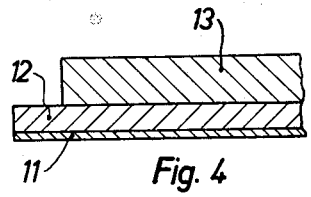
Figure 5:
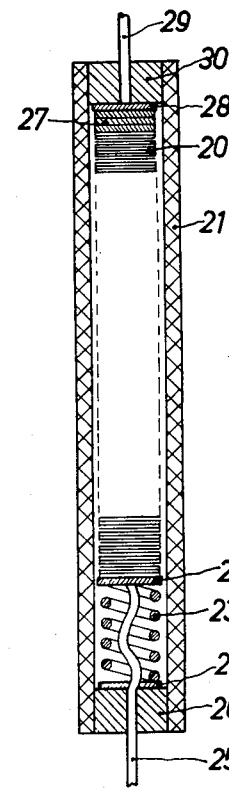
Figure 2:
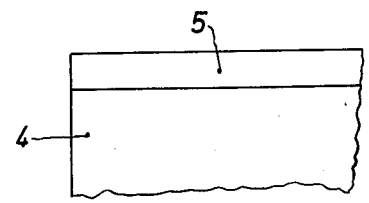
Figure 3:
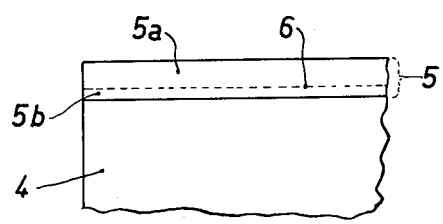

The above-mentioned features and advantages as well as the methods according to our invention of manufacturing such rectifiers, will be apparent from the following description in conjunction with the drawing in which:

Fig. 1 is explanatory and shows on an enlarged scale a fragmentary cross section of a selenium rectifier of the known design;

Figs. 2 and 3 show respective fragmentary views, also on a larger than natural scale, of two structures corresponding to two different manufacturing stages of a method according to the invention; while Fig. 4 shows a similar view of a rectifier unit according to the invention as resulting from the method elucidated by Figs. 2 and 3; and Fig. 5 exemplifies by a sectional illustration an assembly comprising a stack of rectifiers according to the invention.

Conventionally, and as shown in Fig. 1, a selenium rectifier is composed essentially of a base electrode 1, a selenium layer 2, and a counter electrode 3, these three parts being intimately joined together in face-to-face contact. As shown, the base electrode 1 of the known rectifiers is much thicker than the selenium layer 2 and the counter electrode 3.

In contrast, a rectifier according to the invention, as shown in Fig. 4, has a base electrode 11 of a very much smaller thickness. For comparison, the selenium layer 12 and the counter electrode 13 are shown in Fig. 4 to have the same thickness as the corresponding layer 2 and electrode 3 in Fig. 1.

Several methods may be used for manufacturing the new rectifier. Generally, we prefer producing the thin base electrode by starting from a base plate of about the same thickness as the base electrodes heretofore customary. The rectifier is first built up upon this base plate and is thereafter split off by dividing the base plate into the thin base electrode and a rest plate. One way of performing this process is as follows:

It is known to electrolize metal layers on plates of another metal after pretreating these plates in such a manner that the metal layers can be split off. Especially a nickel coating electrolytically applied to a base can be separated therefrom if the base was pretreated by a solution of nigrosine. For manufacturing the new rectifier, a thin nickel layer is electrolytically applied to a base plate, for instance, to a metal sheet like those heretofore used for producing the base electrodes of the conventional selenium rectifiers. Before applying the nickel layer, this base plate is treated with a nigrosine solution. We prefer to roughen the base plate prior to the chemical pretreatment by sand blasting or by any other roughening process. This results in a better adhesion of the selenium layer to be subsequently applied to the nickel layer. The nickel-coated base plate treated in the just-mentioned manner is then used for producing a selenium rectifier in a known manner. In the resulting structure, the entire base plate forms at first the base electrode of the rectifier which has about the same thickness as the conventional rectifiers. Thereafter the nickel layer with the semi-conducting layer and the counter electrode is separated as a unit from the base plate thus splitting the nickel-plated base plate into a nickel layer and a bulky rest corresponding to the original base plate. The nickel layer then forms the base electrode of the separated rectifier unit.

While as described the formation of the rectifiers may be completed in any known manner before the base plate is split, the process may be modified by separating the rectifier unit from the base plate already before completing the manufacture of the rectifier, for instance, before the first tempering treatment or before the second tempering treatment, if the process involves two such treatments. The rectifier unit is then finished separate from the original base plate. Instead of a nickel layer, a layer of another suitable metal may be used.

It has been proposed to improve the contact between the selenium layer and the base electrode by providing an intermediate thin selenide zone. This may be done by selenidizing the base electrode before applying the selenium layer thereto. A nickel layer wholly or partly selenidized is particularly suitable. A simple method of producing the selenide layer is as follows: A small quantity of selenium is applied to the nickel face of a nickel-plated base plate, for instance by spraying or vaporizing. Then the base plate is heated to a temperature of somewhat more than 300° C. This causes the selenium to evaporate. The resulting selenium vapors react with the nickel coating, and a nickel-selenide zone is produced. If this selenidizing process is continued until nearly the whole thickness of the nickel coating or the base plate is selenidized, the subsequent separation of the nickel selenide layer from the original base plate is facilitated, as the selenide layer adheres more firmly to the selenium layer than to the base plate. The unit, comprising the selenide layer with the selenium layer and with the counter electrode, can therefore more easily be removed from the original base plate.

Fig. 2 shows at 4 the base plate and at 5 the nickel layer before the selenidizing treatment. Fig. 3 shows the same elements after the treatment, a dotted line 6 indicating schematically a plane between the selenide layer 5a and the rest of the nickel layer 5b. In or near this plane 6, the separation of the selenide layer from the base plate 4 takes place, so that the selenide layer alone forms the base electrode of the finished rectifier unit. The separation can be effected at the end of the manufacturing process or during the course of the process, for instance, prior to the last tempering. It will be recognized that rectifiers made in this way have a base electrode which does not consist of metal but of a selenide. To form a selenide base electrode, metals other than nickel, for instance bismuth may also be employed.

As mentioned, a finished rectifier unit resulting from the above described process is shown in Fig. 4. The base electrode 11 of such a unit has the extremely small thickness mentioned in the foregoing, and this thickness is even smaller than that of the selenium layer 12 and that of the counter electrode 13. The thickness of the entire unit can be further reduced by dimensioning the thickness of the selenium layer and of the counter electrode between 0.1 to 0.2 mm.

Aside from the advantages mentioned above, rectifiers according to the invention can be cut like foils with a knife or with scissors. This offers the possibility of giving such rectifiers their final size and shape by cutting them out of a larger rectifier foil. Any then resulting short-circuit connections occurring at the cut edges can be easily burnt out by the short-lasting application of a strong voltage. This adaptability as to size and shape of the rectifier, together with its flexibility, make such a rectifier advantageously suitable for many applications involving particular space and dimensional requirements difficult to satisfy with the known rectifiers.

The rectifier assembly shown in Fig. 5 contains a great number of thin dry rectifier disks 20 according to the invention stacked to a column. The rectifier disks 20 may be circular. They are surrounded by an insulating tube 21, which may also be of circular cross section. On the one side of the stack, a contact disk 22 is pressed against the first disk of the stack by a spring 23, which is supported by a disk 24 inserted in the tube 21. A conductor 25 passes through the disk 24 and is connected to the disk 22. The inner end of conductor 25 is flexible so that the disk 22 can be moved by the pressure of the spring 23. The space between disk 24 and the end of tube 21 is filled with insulating sealing material 26. Located at the other side of the stack of rectifier disks 20 are disks 27 and 28 of metal. A conductor 29 is connected to the disk 28. The space between disk 28 and the end of the tube 21 is filled with insulating sealing material 30.

Since the invention permits various modifications and changes aside from those specifically described without departing from the spirit and scope of the invention, it is intended that the disclosure in the above description shall be construed as illustrative and not in a limiting sense.

We claim:

1. A dry rectifier unit, comprising a flexible base electrode of a maximum thickness of about 0.01 mm., a flexible counter electrode, and a flexible semi-conductive layer disposed between said two electrodes and firmly joined therewith, said electrodes and said layer forming together a flexible and independently operable rectifier unit.

2. A dry rectifier unit, comprising a flexible base electrode consisting of a foil, a flexible selenium coating intimately joined with said base electrode, and a flexible counter electrode firmly joined with said selenium coating and forming a barrier layer together therewith, said electrodes and said coating forming together a flexible foil structure operative as a rectifier.

3. A dry rectifier unit, comprising a flexible base electrode, a flexible counter electrode, and a flexible selenium layer intermediate said electrodes and firmly joined therewith, said counter electrode and said selenium layer having each a thickness between about 0.1 to 0.2 mm., said base electrode having a smaller thickness than said counter electrode and said selenium layer, and said counter electrode and said selenium layer forming together with said base electrode a flexible foil structure independently operable as a rectifier.

4. A dry rectifier unit, comprising a flexible base electrode of a maximum thickness of about 0.01 mm., at least a surface stratum of said base electrode consisting of a selenide, a selenium layer joined with said selenide and a counter electrode joined with said layer, said electrodes and said layer forming together a self-containedly operable rectifier unit flexible as a whole.

5. A dry rectifier unit, comprising a flexible base electrode of a maximum thickness of about 0.01 mm. and having a surface zone consisting of a nickel selenide, a selenium layer joined with said selenide and a counter electrode joined with said layer, said counter electrode and said selenium layer having each a thickness between about 0.1 to 0.2 mm. and forming together with said base electrode a flexible foil structure.

6. The method of manufacturing a dry rectifier, which comprises producing a separable selenide coating of foil thickness upon a base plate, depositing onto said coating a firmly adherent layer of selenium of foil thickness, depositing onto said layer a firmly adherent counter electrode of foil thickness, and separating said selenide coating together with said layer and said electrode from said base plate.

7. The method of manufacturing a dry rectifier, which comprises treating a base plate with nigrosine solution, electroplating a nickel coating onto said base plate, depositing onto said coating a firmly adherent selenium layer, depositing onto said layer a firmly adherent counter electrode, and detaching said coating together with said layer and said electrode as a unit from said base plate.

(References on following page)

References Cited in the file of this patent

UNITED STATES PATENTS

| | | |
|---|---|---|
| 1,796,372 | Jamison | Mar. 17, 1931 |
| 1,919,988 | Rupp | July 25, 1933 |
| 1,980,176 | Becker | Nov. 13, 1934 |
| 1,994,632 | Becker | Mar. 19, 1935 |
| 2,163,393 | Brunke | June 20, 1939 |
| 2,194,182 | Kotterman | Mar. 19, 1940 |
| 2,496,692 | Blackburn | Feb. 7, 1950 |